Patented Aug. 8, 1950

2,517,945

UNITED STATES PATENT OFFICE 2,517,945

POLYMERIC ORGANOSILANOL-BORONIC ACID REACTION PRODUCTS AND METHOD FOR MAKING SAME

Robert W. Upson, Wilmington, Del., assignor to E. I. du Pont de Nemours & Company, Wilmington, Del., a corporation of Delaware No Drawing. Application March 19, 1947, Serial No. 735,805

16 Claims. (Cl. 260—2)

This invention relates to polymeric materials and more particularly to organo-inorganic polymers, to a method for their preparation, and to films and fibers made from these new polymers.

Heretofore polymers derived from organic compounds have been investigated extensively and are well known. However, relatively little is known of polymers derived from organo-inorganic compounds, and even less is known of organo-inorganic polymers containing two different inorganic components. Although some organo-inorganic polymers containing silicon as the sole inorganic component have been described in the prior art, such organo-silicon polymers have not been formed into fibers.

It is an object of this invention to provide new polymeric materials. A further object is to provide new organo-inorganic polymers and a method for their preparation. A still further object is to provide new organo-inorganic polymers containing two different inorganic components. Another object is to provide films and fibers from new organo-inorganic polymers. Other objects will appear hereinafter.

These objects are accomplished by the following invention of organo-inorganic polymers containing both silicon and boron in the polymer structure, of fibers and films made from these new polymers and a process for preparing the new organo-inorganic polymers. It has now been discovered that organo-inorganic polymers containing both silicon and boron can be prepared by reacting a polyhydric organosilanol with a boronic acid.

Polyhydric organosilanols have 2 or 3 hydroxyl groups attached to silicon, and have the general formula

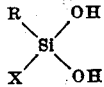

wherein R is a monovalent organic radical and X is either a monovalent organic radical or a hydroxyl group. The organo-silanetriols, $RSi(OH)_3$, may lead to cross-linked polymers when reacted with boronic acids. On the other hand, the organo-silanediols, having the formula $R_2Si(OH)_2$ and in which the R groups may be the same or different, do not cause cross-linking in the reaction with boronic acids. Polymers prepared from the organosilanediols are preferred for the manufacture of films, fibers, and the like. The monovalent organic radicals in these polyhydric organosilanols can be substituted or unsubstituted, saturated or unsaturated, aliphatic, aromatic or cycloaliphatic radicals.

Also preferred are the polyhydric organosilanols in which the monovalent organic radicals are hydrocarbon radicals. Particularly preferred in this class of polyhydric hydrocarbosilanols are the polyhydric arylsilanols, for example, diphenylsilandiol and phenylsilanetriol.

Boronic acids have the formula $RB(OH)_2$, wherein R is a monovalent organic radical, such as substituted or unsubstituted, saturated or unsaturated, aliphatic, aromatic, and cycloaliphatic radicals. The preferred boronic acids are the hydrocarbon boronic acids having the formula $RB(OH)_2$, wherein R is a monovalent hydrocarbon radical. Particularly preferred are boronic acids containing the

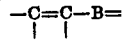

group, such as the aryl boronic acids, for example, benzeneboronic acid, and vinylboronic acids. These particular boronic acids are more resistant to oxidative cleavage of the boron-carbon bond than acids containing the $—CH_2—B=$ group.

A convenient way to carry out the reaction for the preparation of these new organo-silicon-boron polymers is to heat a mixture of a polyhydric organosilanol, for example, diphenylsilanediol, and a boronic acid, for example, benzene-boronic acid, under atmospheric pressure in a reaction vessel at a temperature sufficient to melt the reactants and to vaporize the water which is formed, preferably at 170° to 260° C. When the evolution of water subsides, the resulting viscous molten polymer is heated under reduced pressure to remove any water vapor or other volatile products remaining in the mixture. The polymer is then allowed to cool to room temperature. The resulting polymer can be used directly or it can be purified by extracting the crude product with a solvent, such as benzene, to dissolve the polymer and to separate it from a small amount of insoluble material formed in the reaction. In the latter case, the polymer is isolated from its solution by evaporation of the solvent followed by drying by conventional procedures.

The polymers of this invention contain both boron and silicon atoms in their recurring structural units. The polymers formed from organosilanediols and boronic acids have recurring structural units of the probable general formula

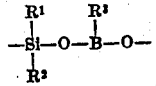

wherein R¹, R², and R³ are monovalent organic radicals, which may be the same or different. The radicals R¹ and R² correspond to the organic radicals in the silanediol, and the radical R³ corresponds to the organic radical in the boronic acid, from which the polymer is made. Preferred polymers are those in which R¹, R² and R³ are monovalent hydrocarbon radicals, especially aryl radicals such as phenyl. These linear polymers are, in general, soft solids at room temperature and have relatively low softening points. They are soluble in organic solvents, such as benzene, ethanol and acetone.

These organo-silicon-boron polymers can be pressed at elevated temperatures into films and extruded into fibers. Their solutions can be formed into films and fibers by conventional methods.

The following examples in which proportions of ingredients are expressed in parts by weight, unless otherwise specified, further illustrate the invention.

*Example I*

A mixture of 648 parts of diphenylsilanediol and 366 parts of benzeneboronic acid is heated in a reaction vessel for 18 hours at a temperature of 260° C. and at atmospheric pressure. A clear, viscous melt results. The pressure in the reaction vessel is reduced to 3 mm. and the molten product is heated for an additional hour at a temperature of 250° C. On cooling to room temperature, the reaction product solidifies to a soft polymer. It begins to flow at a temperature of 80° C. and forms a clear melt at a temperature of 155° C. The polymer is soluble in methanol, acetone, and dioxane. Analyses indicate that the polymer contains 20.8% silicon and 4.8% boron. This polymer can be pressed into clear, transparent films at a temperature of 60° C., and fibers can be drawn from the molten polymer.

*Example II*

A mixture of 32.4 parts of diphenylsilanediol and 73.2 parts of benzeneboronic acid is placed in a reaction vessel and heated under atmospheric pressure at a temperature of 204–215° C. for 20.5 hours. The pressure in the reaction vessel is then reduced to 1–3 mm. and the reactants heated for 6 hours more at a temperature of 215–230° C. and for an additional 6 hours at a temperature of 170° C. The resulting product is a viscous polymer which solidifies on cooling to room temperature. The product is dissolved in 440 parts of benzene, the solution is filtered, and the polymer is isolated by evaporation of the benzene solution, followed by drying. The polymer is soluble in acetone, ethanol, and benzene and softens at a temperature of 60° C. Analyses indicate that the polymer contains 7.9% silicon and 4.0% boron. Clear, transparent films can be pressed from this polymer at a temperature of 60° C., and fibers can be drawn from the molten polymer.

The polyhydric organosilanols used in this invention may be prepared by hydrolysis of the corresponding organodichloro- and organotrichlorosilanes which may be obtained by reaction of a Grignard reagent with silicon tetrachloride as described in J. A. C. S. 63, 801 (1941), and J. A. C. S. 67, 2173 (1945). Boronic acids may be obtained by reaction of a Grignard reagent with an ester of boric acid as described in J. A. C. S. 54, 4415 (1943).

Among the polyhydric organosilanols useful in the practice of this invention are those in which R and X (when X is an organic radical, and which may be the same as R or different) in the general formula $$RSi(OH)_3$$
$$X$$

are aliphatic saturated hydrocarbon radicals, e. g., ethyl; unsaturated aliphatic hydrocarbon radicals, e. g., allyl; aromatic hydrocarbon radicals, e. g., phenyl; or cycloaliphatic hydrocarbon radicals, e. g., cyclohexyl.

Among the boronic acids suitable for use in this invention are those in which R in the general formula $RB(OH)_2$ is a saturated aliphatic hydrocarbon radical, e. g., methyl, ethyl, and propyl; an unsaturated aliphatic hydrocarbon radical, e. g., vinyl and allyl; an aromatic hydrocarbon radical, e. g., phenyl, alpha-naphthyl, beta-naphthyl, o-tolyl, and p-tolyl; a cycloaliphatic hydrocarbon radical, e. g., cyclopentyl and cyclohexyl; a substituted aromatic hydrocarbon radical, e. g., p-chlorophenyl; a substituted saturated aliphatic radical, e. g., beta-chloroethyl; a substituted unsaturated aliphatic hydrocarbon radical, e. g., beta-chlorovinyl, or an araliphatic radical, e. g., benzyl and beta-phenylvinyl.

The relative proportions of polyhydric organosilanol and organo-boronic acid used in the preparation of the organo-silicon-boron polymers of this invention can be varied over wide limits. The molar ratio of polyhydric organosilanol to boronic acid can vary from less than 1:4 to more than 4:1. The exact proportions selected depend on the relative proportions of silicon and boron desired in the resulting polymer. Polymers obtained by reacting diphenylsilanediol with benzeneboronic acid in molar proportions ranging frof 4:1 to 1:4 have been found to possess $(C_6H_5)_2SiO/C_6H_5BO$ ratios ranging from 3:1 to 1:1.6.

Modifying agents such as monohydric organosilanols $(R_3SiOH)$ and boronic acids $(R_2BOH)$ may be added to the reactants either at the start or at any stage of the reaction. These agents act to terminate polymer chains and are accordingly useful in controlling the molecular weight of the polymers.

The reaction times and temperatures are interdependent variables. In general, it is desirable to operate at temperatures above the melting point of the reactants and above 100° C. in order to vaporize the water formed in the reaction. The preferred temperature range is from 170° to 260° C. The reactions carried out at the lower temperatures must be carried out for longer times. At any temperature, the reaction is continued until the desired degree of polymerization is obtained.

The reaction can be carried out at atmospheric pressure or at reduced pressure, volatile by-products being removed more rapidly when the process is carried out at low pressures.

The products of this invention are suitable for use in the preparation of fibers, films, and other shaped objects, and in the preparation of coating compositions.

As many apparently widely different embodiment of this invention may be made without departing from the spirit and scope thereof, it is to be understood that this invention is not limited to the specific embodiments thereof except as defined in the appended claims.

I claim:

1. A process for preparing an organo-inorganic polymer which comprises heating a hydrocarbosilanediol with a hydrocarbon boronic acid at a temperature above the melting point of said reactants and vaporizing the water formed in the reaction.

2. A process for preparing an organo-inorganic polymer which comprises heating a diarylsilanediol with a boronic acid containing the

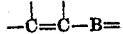

group at a temperature above the melting point of said reactants and vaporizing the water formed in the reaction.

3. A process for preparing an organo-inorganic polymer which comprises heating a diarylsilanediol with an aryl boronic acid at a temperature above the melting point of said reactants and vaporizing the water formed in the reaction.

4. A process for preparing an organo-inorganic polymer which comprises heating diphenylsilanediol with benzeneboronic acid at a temperature above the melting point of said reactants and vaporizing the water formed in the reaction.

5. The polymeric reaction product of a hydrocarbosilanediol and a hydrocarbon boronic acid, said polymeric reaction product having as recurring structural units

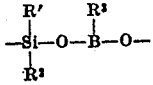

where $R'$, $R^2$ and $R^3$ are monovalent hydrocarbon radicals.

6. The polymeric reaction product of a diarylsilanediol and a boronic acid containing the

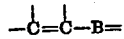

group, said polymeric reaction product having as recurring structural units

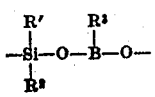

where $R'$ and $R^2$ are monovalent aryl radicals and $R^3$ is a monovalent hydrocarbon radical containing the

group directly joined to boron.

7. The polymeric reaction product of a diarylsilanediol and an aryl boronic acid, said polymeric reaction product having as recurring structural units

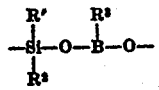

where $R'$, $R^2$ and $R^3$ are monovalent aryl radicals.

8. The polymeric reaction product of diphenylsilanediol and benzeneboronic acid, said polymeric reaction product having as recurring structural units

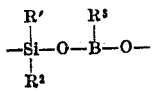

where $R'$, $R^2$ and $R^3$ are phenyl radicals.

9. A fiber formed of the polymeric product set forth in claim 6.

10. A self-supporting film formed of the polymeric product set forth in claim 6.

11. A fiber formed of the polymer product set forth in claim 5.

12. A self-supporting film formed of the polymeric product set forth in claim 5.

13. A fiber formed of the polymeric product set forth in claim 8.

14. A self-supporting film formed of the polymeric product set forth in claim 8.

15. A process for preparing an organo-inorganic polymer which comprises heating a hydrocarbosilanediol with a boronic acid selected from the class consisting of hydrocarbon and chlorohydrocarbon boronic acids at a temperature above the melting point of said reactants and vaporizing the water formed in the reaction.

16. The polymeric reaction product of a hydrocarbosilanediol and a boronic acid selected from the class consisting of hydrocarbon and chlorohydrocarbon boronic acids, said polymeric reaction product having as recurring structural units

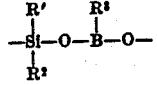

where $R'$ and $R^2$ are monovalent hydrocarbon radicals and $R^3$ is selected from the class consisting of monovalent hydrocarbon and monovalent chlorohydrocarbon radicals.

ROBERT W. UPSON.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,371,068 | Rochow | Mar. 6, 1945 |
| 2,443,898 | Ellingboe | June 22, 1948 |

OTHER REFERENCES

Di Giorgio, Abstract 109 Meeting A. C. S., 1946, pp. 26M and 27M.

Sommer et al., Journ. Amer. Chem. Soc., vol. 68, June 1946, page 1083.

D'Giorgio et al., Journal Amer. Chem. Soc., February 1946, vol. 68, page 344.

Rochow, Chemistry of the Silicones, Wiley, 1946, page 35.